United States Patent [19]
DeLong

[11] Patent Number: 4,987,735
[45] Date of Patent: Jan. 29, 1991

[54] HEAT AND POWER SUPPLY SYSTEM

[75] Inventor: Bradley W. DeLong, West Columbia, Tex.

[73] Assignee: Phillips Petroleum Company, Bartlesville, Okla.

[21] Appl. No.: 445,520

[22] Filed: Dec. 4, 1989

[51] Int. Cl.[5] .............................................. F02C 7/10
[52] U.S. Cl. ................................. 60/39.04; 60/39.07; 60/39.17; 60/39.511
[58] Field of Search ................. 60/39.04, 39.07, 39.16, 60/39.17, 39.182, 39.511

[56] References Cited

U.S. PATENT DOCUMENTS

| | | | |
|---|---|---|---|
| 2,485,023 | 10/1949 | Traupel | 60/39.17 |
| 2,605,610 | 8/1952 | Hermitte et al. | 60/39.182 |
| 2,633,707 | 4/1953 | Hermitte et al. | 60/39.17 |
| 2,646,663 | 7/1953 | Sedille | 60/39.511 |
| 2,717,491 | 9/1955 | Barr | 60/39.182 |
| 3,054,257 | 9/1962 | Schelp | 60/39.511 |
| 3,150,487 | 9/1964 | Mangan et al. | 60/39.182 |
| 4,446,694 | 5/1984 | Walton | 60/39.182 |

FOREIGN PATENT DOCUMENTS 1187060  9/1959  France .............................. 60/39.511

OTHER PUBLICATIONS

Brown, Michael L. "Alternate Fuel Gas Turbine Cycles", In: 1982 17th *Intersociety Energy Conversion Engineering Conference*, vol. 3, (New York, IEEE, 1982), pp. 1112–1117.

Considine, Douglas M., *Energy Technology Handbook*, New York, McGraw-Hill, 1977, pp. 9-166 to 9-169 and 9-178 to 9-181.

Garner, Phillip B., "Total Energy", In: Sawyer, John W., ed. *Gas Turbine Engineering Handbook* (Stamford, Conn., Gas Turbine Publications, 1966), pp. 255–270.

Sawyer, R. Tom. *The Modern Gas Turbine*, New York, Prentice-Hall, Inc., 1945, pp. 68, 69, 92–95, 110–113.

*Primary Examiner*—Louis J. Casaregola
*Attorney, Agent, or Firm*—William R. Sharp

[57] ABSTRACT

An apparatus and method are provided which are capable of independent adjustment of the heat and power in a combined system. Intermediate heat and pressure exhaust is extracted from an intermediate point in the main turbine system. This exhaust goes to a regenerator and then an auxiliary turbine. The exhaust that is not extracted continues to power the main turbine system and flows from the low pressure end to the turbine system to a waste heat boiler.

19 Claims, 5 Drawing Sheets

HEAT AND POWER SUPPLY SYSTEM

BACKGROUND OF THE INVENTION

In one aspect, the invention relates to a method for operating a combined heat and power supply system. According to another aspect, the invention relates to an apparatus for supplying heat and power.

In a gas turbine process, compressed air is fed to a combustion chamber in which combustion of a fuel takes place. The combustion produces high pressure and temperature exhaust gas. This high pressure and temperature gas drives the turbine blades which turn a shaft. The mechanical power of the shaft is used to drive a load; typically an electrical generator.

Most gas turbine processes require waste heat recovery on the turbine exhaust to achieve an acceptable overall efficiency. This is called a combined cycle. Usually, the turbine exhaust gas is directed through a steam boiler to produce low-pressure steam or hot water that is used for operation of space heating equipment, domestic hot water heaters, and absorption refrigeration equipment.

A problem arises in utilizing a combined cycle because the waste heat boiler duty will be dependent on the shaft power load even though the steam demand may be totally unrelated to the shaft power load demand. Thus at times an excess of useful exhaust heat will exist, and at other times a deficiency will exist.

In the past a deficiency in useful exhaust heat has been overcome by burning additional fuel in the exhaust stream or by providing a supplemental furnace. The later is not thermally efficient, and the former is expensive and complex to install. On the other hand, an excess of exhaust heat results in wasted energy, lower thermal efficiency and lowered profitability.

SUMMARY OF THE INVENTION

It is, therefore, an object of the present invention to provide an improved apparatus and method which can accomodate for changes in demand for steam from the waste heat boiler without sacrificing efficiency.

The above object is realized in a method of supplying heat and power of the type which includes feeding compressed oxidant gas from a gas compressor to a combustion chamber in which combustion of a fuel takes place, flowing high pressure and temperature combustion products from the combustion chamber to an inlet end of a main turbine system so as to supply mechanical power to a shaft to thereby drive the shaft and so as to produce low pressure and temperature exhaust from an outlet end of the main turbine system, wherein the improvement comprises: extracting at least a portion of an intermediate pressure and temperature exhaust from a point in between the inlet and outlet ends of the main turbine system; passing the intermediate pressure and temperature exhaust through a regenerator in heat exchange relationship with the compressed oxidant gas so as to preheat the compressed oxidant gas before the oxidant gas enters the combustion chamber, thereby cooling the intermediate pressure and temperature exhaust to yield a regenerator exhaust; passing the regenerator exhaust from the regenerator to an auxiliary turbine which also drives the shaft; and flowing low pressure and temperature exhaust from the outlet end of the main turbine system to a heat exchanger (i.e. waste heat boiler) so that heat is transferred from the low pressure and temperature exhaust to a fluid flowing through the heat exchanger in heat exchange relationship with the low pressure and temperature exhaust.

According to another aspect of the invention, there is provided an apparatus for supplying heat and power of the type which includes a compressor, combustion chamber and main turbine system as discussed above, wherein the improvement comprises: exhaust extraction means for extracting intermediate pressure and temperature exhaust from a point in between the inlet and outlet ends of the main turbine system; a regenerator for receiving intermediate pressure and temperature exhaust from the main turbine system and compressed oxidant gas from the compressor such that the intermediate pressure and temperature exhaust flows in the regenerator in heat exchange relationship with the compressed oxidant gas so as to preheat the compressed oxidant gas before the oxidant gas enters the combustion chamber, thereby cooling the intermediate pressure and temperature exhaust to yield a regenerator exhaust; an auxiliary turbine which is also adapted to drive the shaft; means for feeding the regenerator exhaust from the regenerator to the auxiliary turbine; a heat exchanger (i.e. waste heat boiler) for receiving low pressure and temperature exhaust from the outlet end of the main turbine system such that the low pressure and temperature exhaust flows in the heat exchanger in heat exchange relationship with a fluid so as to heat the fluid.

The flow of intermediate pressure and temperature exhaust can be regulated so as to control the flow of low pressure and temperature exhaust from the outlet end of the main turbine system to the waste heat boiler. Since the extracted intermediate pressure and temperature exhaust determines, after passing through the regenerator, the input to the auxiliary turbine, the mechanical power supplied to the shaft will not be substantially affected by control of the low pressure and temperature exhaust flow to the wast heat boiler. This is particularly advantageous where the shaft drives a load, such as an electrical generator, for which a constant output is desired, but where there is a varying demand for steam from the waste heat boiler.

DETAILED DESCRIPTION OF THE INVENTION

In the embodiments hereinafter described air is utilized as an oxidant gas; however, other forms of oxidant gas may be used. Furthermore, these embodiments use a waste heat boiler to recover waste heat by producing steam from water; however, other forms of heat exchangers and other fluids may be utilized to accomplish recovery of waste heat.

Figure 1:
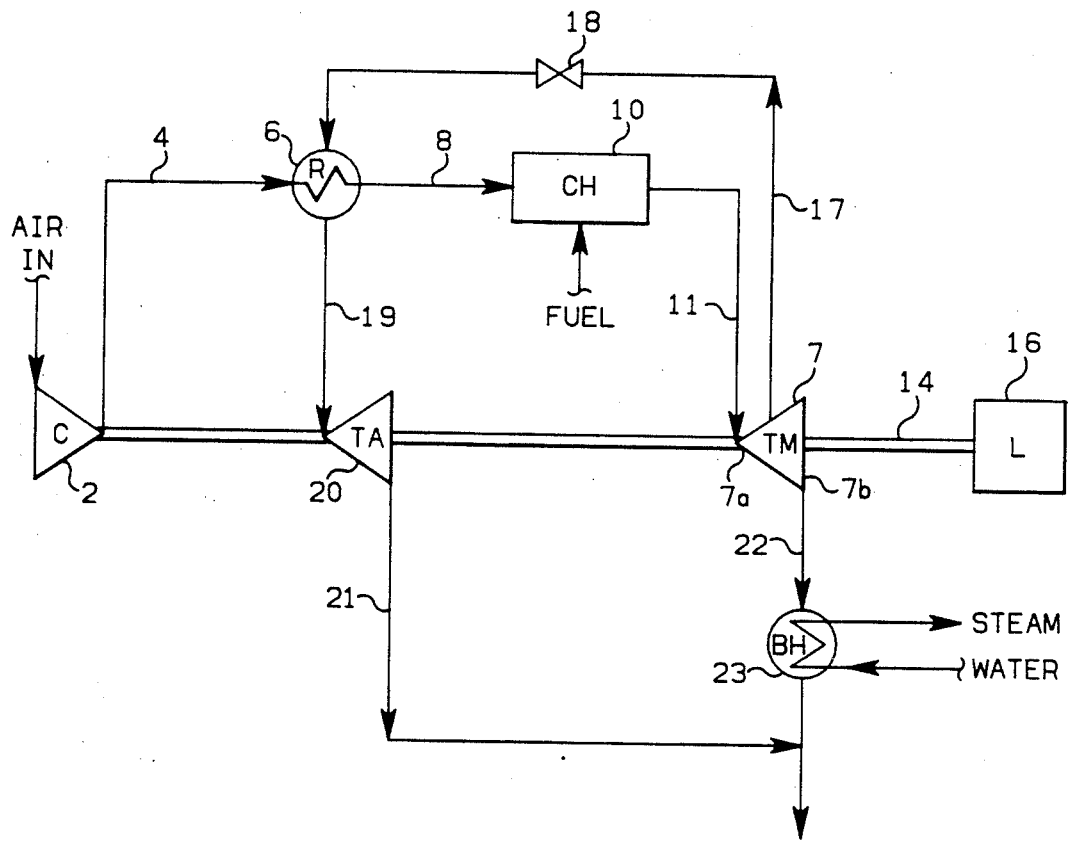
FIG. 1 is a schematic representation of an embodiment of a combined heat and power supply system in accordance with the invention.

In the embodiment illustrated in FIG. 1, the air enters air compressor (C) 2 and is compressed without any cooling means. If such a cooling were performed it would constitute a loss of heat to the cold source which would reduce general efficiency. The high pressure compressed air leaves compressor 2 and is passed through line 4 to regenerator (R) 6 where it passes in heat exchange relationship with intermediate pressure and temperature exhaust coming from the main turbine system (TM) 7 in a manner further described below. This results in preheating of the compressed air. The use of intermediate pressure and temperature exhaust better preheats the compressed air than the use of low pressure and temperature exhaust because of the greater temperature difference between the former and the compressed air. Often low temperature exhaust will be approximately the same temperature as the compressed air and, thus, heat exchange will be minimal.

After preheating, the compressed air flows through line 8 to a combustion chamber (CH) 10, operating under constant pressure, in which combustion of a fuel takes place to produce a hot combustion exhaust gas. Typical conditions of this exhaust gas include a temperature of about 2000° F. and a pressure of about 200 psia. This high temperature and pressure exhaust gas flows to the inlet end 7a of main turbine system 7 via line 11. The main turbine system 7 accordingly supplies mechanical power to shaft 14 so as to drive shaft 14 and perform work on the load (L) 16 and run the compressor 2. At a point between inlet end 7a and outlet end 7b of main turbine system 7, which in the illustrated embodiment comprises only one turbine, exhaust is extracted at an intermediate pressure and temperature. Typical conditions of the intermediate pressure and temperature exhaust include a pressure of about 25 psia to about 100 psia and a temperature of about 1000° F. to about 1500° F. The amount of exhaust extracted depends on the waste heat boiler duty, as will be discussed further below, with more exhaust being extracted when the duty is low and less when the duty is high. The intermediate pressure and temperature exhaust is channeled via line 17 from main turbine system 7 to regenerator 6 to preheat the compressed air. As shown, a valve 18 is positioned along line 17 and is adapted to regulate the flow of extracted intermediate pressure and temperature exhaust from main turbine system 7 and through line 17. In the regenerator the exhaust remains at constant pressure but cools to yield a regenerator exhaust which flows to auxiliary turbine (TA) 20 via line 19. The exhaust expands to propel turbine 20, which aids in driving the shaft 14 and then flows off as waste exhaust through line 21.

Gas that is not extracted at an intermediate point in main turbine system 7 continues to power the turbine system and is finally discharged at the outlet end 7b of the turbine system 7. This low temperature and pressure exhaust at conditions of, for example, less than 1000° F. and about atmospheric pressure, then flows through line 22 to waste heat boiler (BH) 23, where such exhaust is passed in heat exchange relationship with water to produce steam for heating and cooling purposes. The exhaust from auxiliary turbine 20 and waste heat boiler 23 will be similar in pressure and temperature.

Varying demands for steam from waste heat boiler 23 can be accomodated by adjusting the setting of valve 18 as to regulate the flow of extracted intermediate pressure and temperature exhaust from main turbine system 7. For example, in case there is an increased demand for steam, valve 18 can be adjusted to decrease the flow of intermediate pressure and temperature exhaust. This causes an increase in flow of low pressure and temperature exhaust from outlet end 7b of main turbine system 7 so as to increase the steam production capacity of waste heat boiler 23. With respect to the power outputs of auxiliary turbine 20 and main turbine system 7, decreasing the intermediate pressure and temperature exhaust flow has the effect of increasing the power output of main turbine system 7, but decreasing the power output of auxiliary turbine 20. The net result is that the power supplied to shaft 14 remains relatively constant, while at the same time the increased demand for steam has been satisfied. Similarly, in case of a decreased demand for steam, valve 18 can be adjusted to appropriately increase the flow of extracted intermediate pressure and temperature exhaust. The power supplied to shaft 14 by the combination of auxiliary turbine 20 and main turbine system 7 will remain relatively constant as the result of a decrease in power from main turbine system 7 and a corresponding increase in power from auxiliary turbine 20.

It should, therefore, be apparent that the invention is particularly advantageous in situations where there are varying demands for steam from the waste heat boiler but a relatively constant demand for power as supplied to shaft 14 which drives load 16. Furthermore, heat from the intermediate pressure and temperature exhaust is effectively utilized in accordance with the invention to preheat the compressed air and, therefore, lower fuel consumption.

Figure 2:
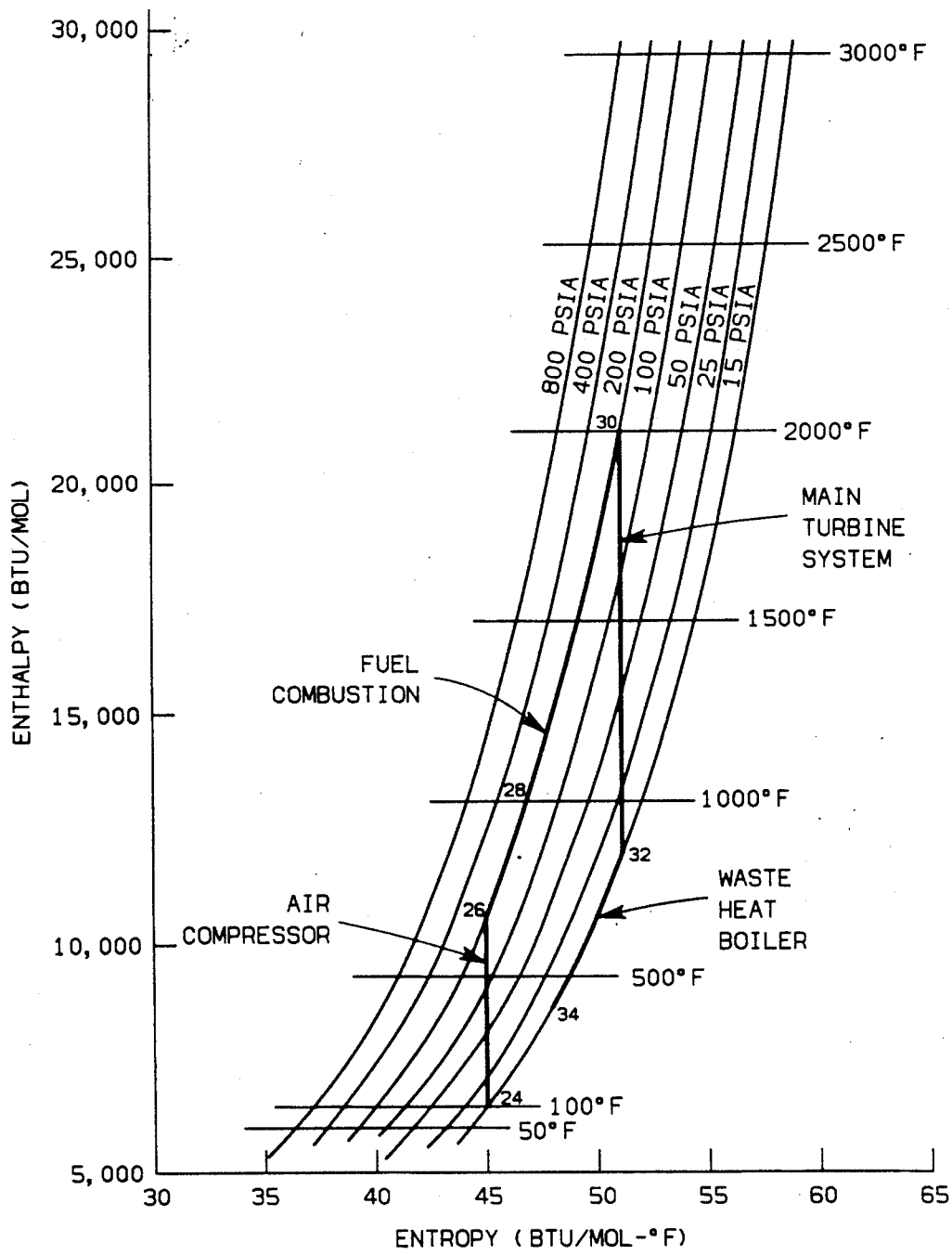
FIG. 2 illustrates diagrammatically the waste heat boiler portion of a calculated heat cycle for the FIG. 1 embodiment.
Figure 3:
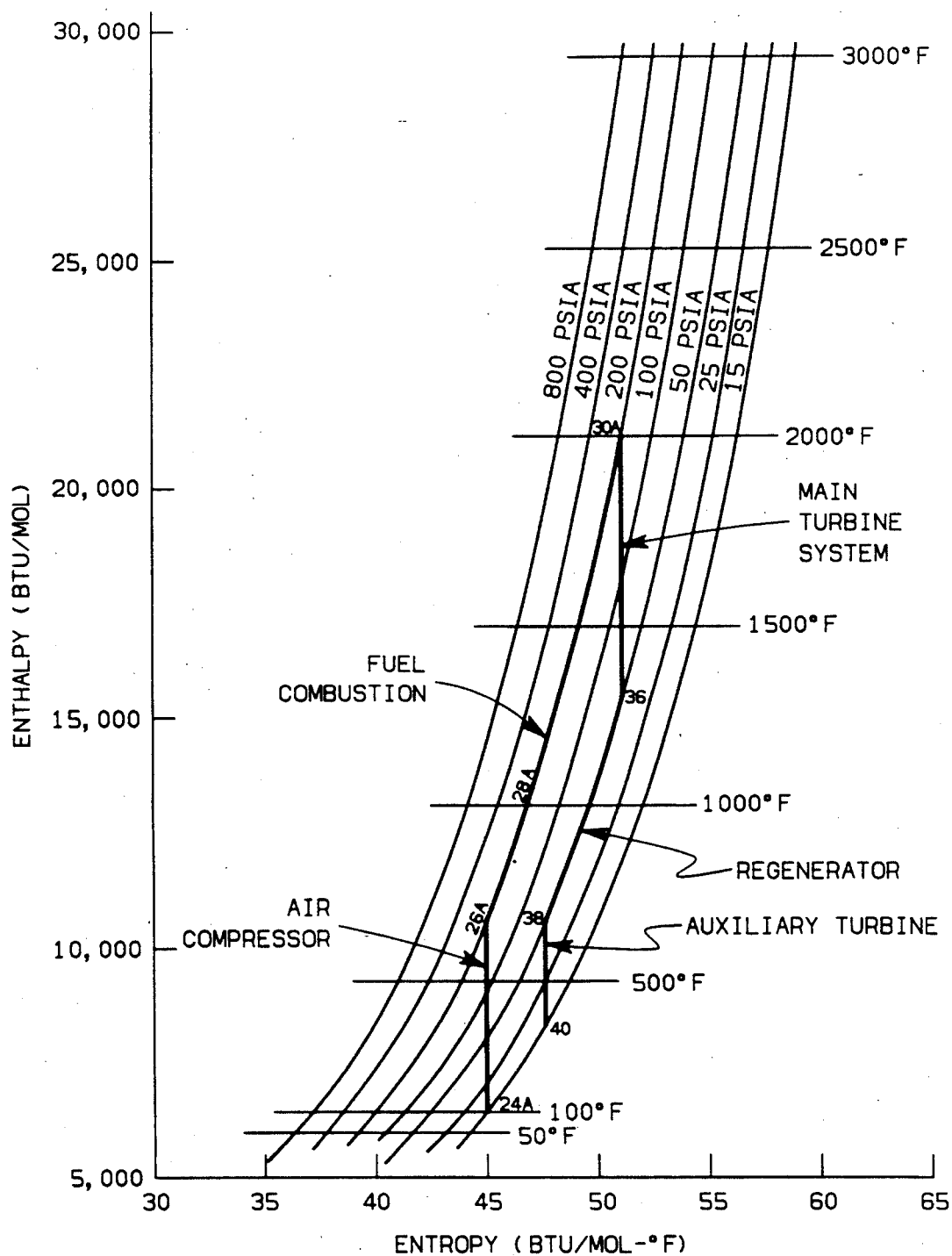
FIG. 3 illustrates diagrammatically the regenerator-auxiliary turbine portion of the above-mentioned cycle.

FIGS. 2 and 3 show diagrammatically a calculated heat cycle for the apparatus of FIG. 1. FIG. 2 illustrates the waste heat boiler portion of the cycle, while FIG. 3 illustrates the regenerator-auxiliary turbine portion of the cycle.

The evolution of the waste heat boiler portion of the cycle on the enthalpy-entropy diagram of FIG. 2 may be described as follows.

From 24 to 26 the air is compressed without any cooling in compressor 2; from 26 to 28 the compressed air gains heat while passing through regenerator 6; from 28 to 30 the combustion is operated under constant pressure in combustion chamber 10; from 30 to 32 expansion takes place in main turbine system 7, where both the temperature and pressure of the gas are reduced; from 32 to 34 the temperature of the exhaust is reduced, as heat from the exhaust is used to make steam in waste heat boiler 23.

The evolution of the regenerator-auxiliary turbine portion of the cycle on the enthalpy-entropy diagram of FIG. 3 may be described as follows.

From 24A to 30A is the same as from 24 to 30 in FIG. 2; from 30A to 36 expansion is provided in main turbine system 7 and extraction of exhaust takes place at point 36 where the exhaust temperature and pressure are higher than at point 32 of FIG. 2; from 36 to 38 the exhaust loses heat to compressed air in regenerator 6, which takes place at constant pressure; from 38 to 40 the exhaust is expanded in the auxiliary turbine 20, resulting in exhaust that is at approximately the same temperature and pressure at point 40 as the exhaust was at point 34 of FIG. 2.

Figure 4:
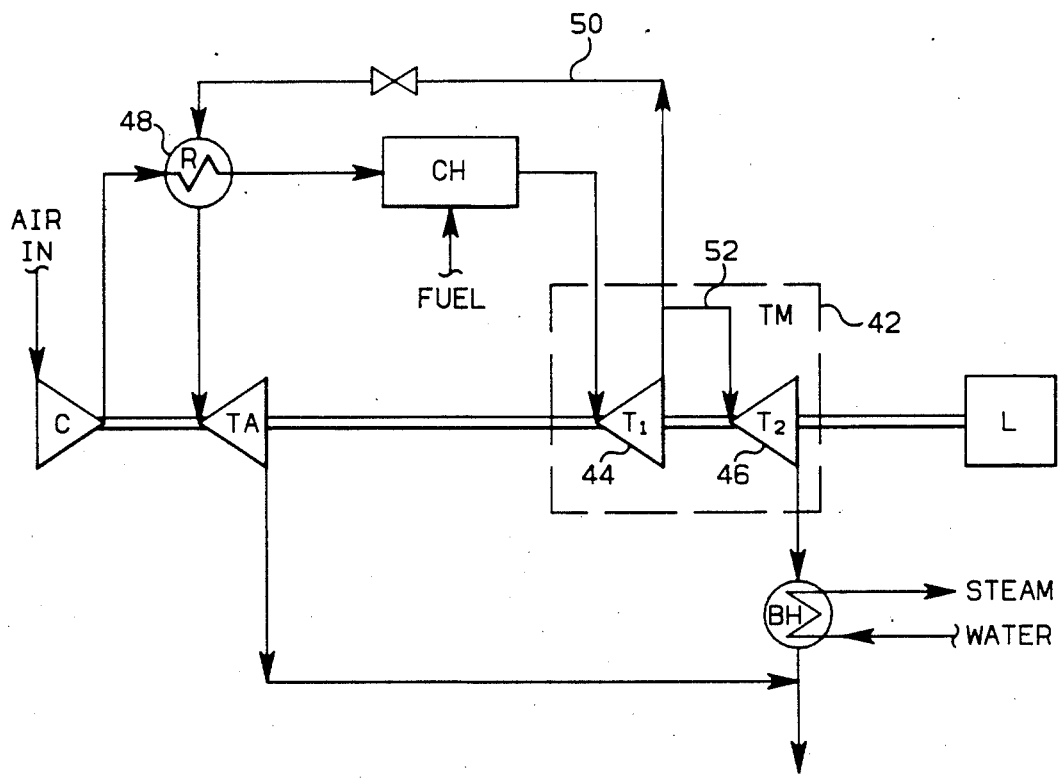
FIGS. 4 and 5 are schematic representations of two other respective embodiments of the invention.

FIG. 4 is a modification of the embodiment of FIG. 1. In FIG. 4, main turbine system (TM) 42 includes two separate turbines 44 and 46 situated such that the inlet end of turbine 44 is the inlet end of turbine system 42 and the outlet end of turbine 46 is the outlet end of turbine system 42. The exhaust from the outlet end of turbine 44 is at intermediate pressure and temperature and is split with part going to regenerator 48 via line 50 and the rest going through line 52 to the inlet end of turbine 46.

Figure 5:
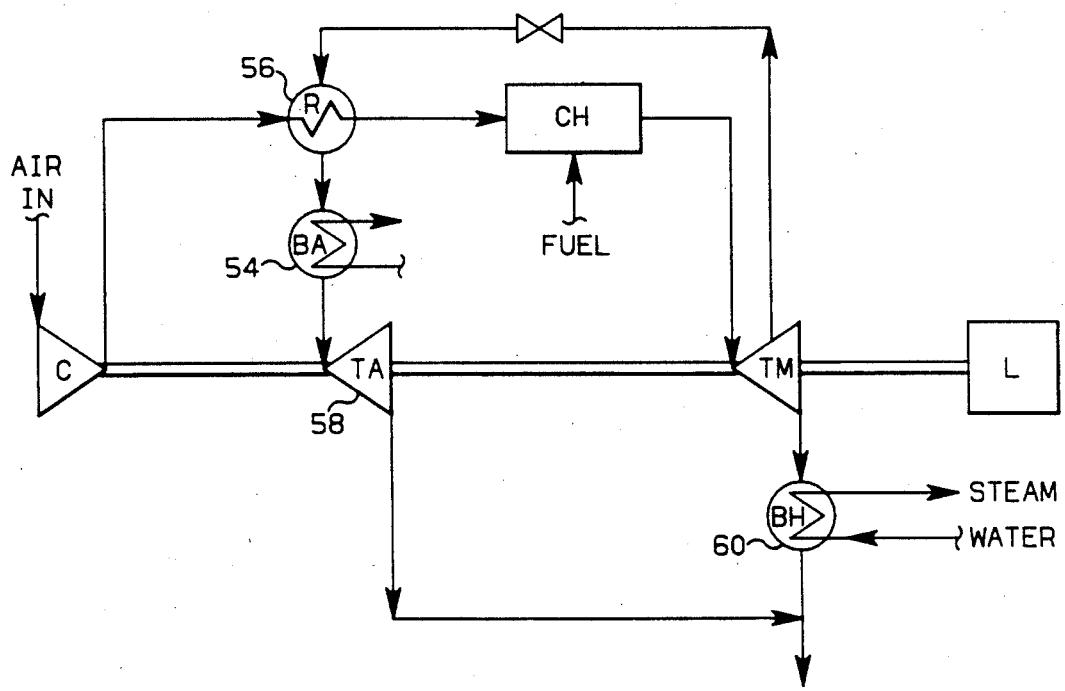

FIG. 5 represents another modification of the FIG. 1 embodiment. In FIG. 5 an additional boiler (BA) 54 has been added between regenerator (R) 56 and auxiliary turbine (TA) 58. Regenerator exhaust is accordingly passed through boiler 54 so as to heat a fluid, such as water. This embodiment has the advantage of producing a lower stack temperature, as can be seen from FIG. 6.

Figure 6:
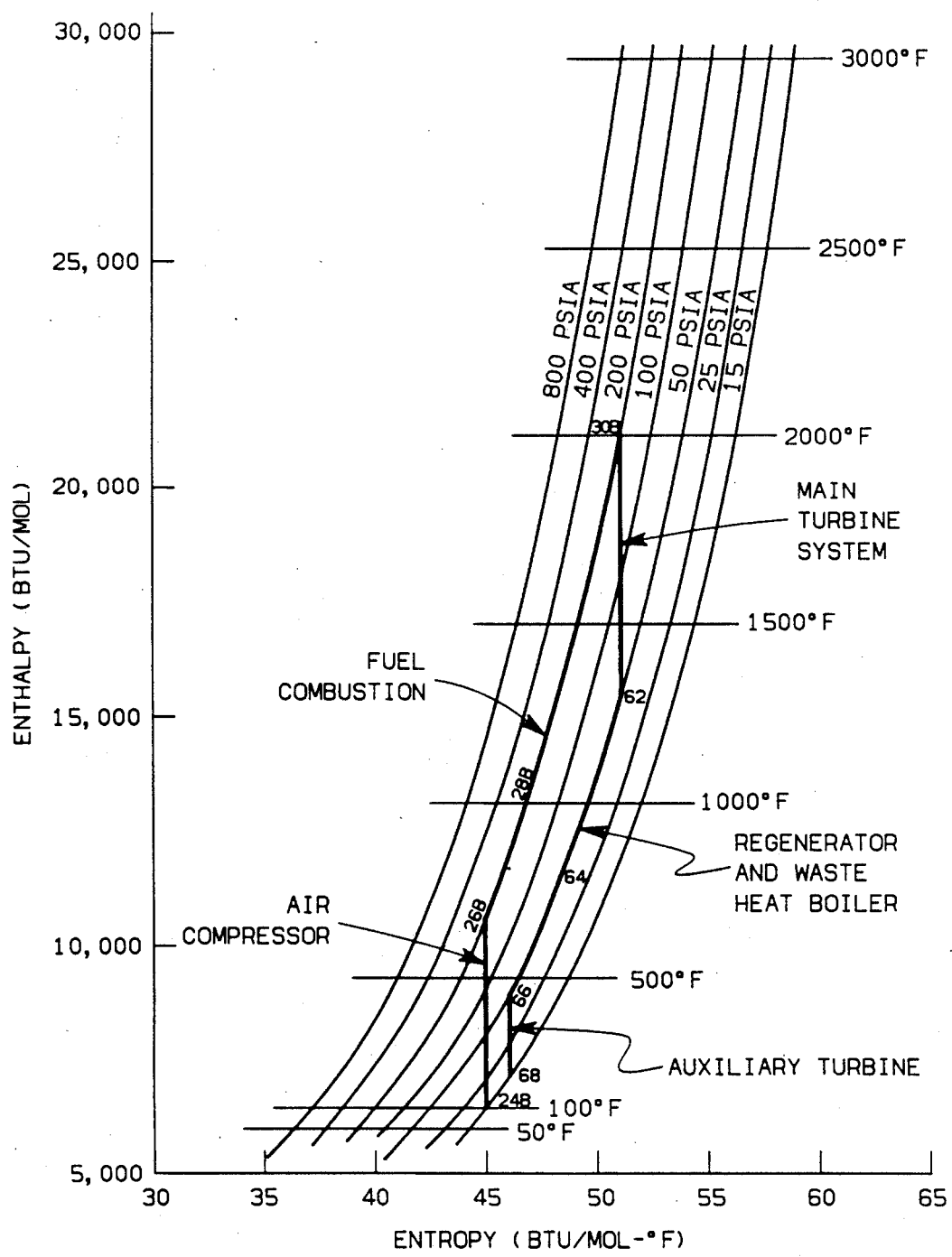
FIG. 6 illustrates diagrammatically the regenerator-auxiliary turbine portion of a calculated heat cycle for the embodiment of FIG. 5.

FIG. 6 illustrates diagrammatically a calculated heat cycle of the embodiment of FIG. 5. From 24B to 30B is the same as from 24 to 30 in FIG. 2 and from 24A to 30A in FIG. 3; from 30B to 62 expansion is provided in the main turbine system and extraction of exhaust takes place at point 62 where the exhaust is at an intermediate temperature and pressure as at point 36 of FIG. 3; from 62 to 64 the exhaust loses heat to compressed air in the regenerator, which takes place at constant pressure; from 64 to 66 the exhaust loses additional heat at constant pressure in boiler 54; finally from 66 to 68 the exhaust is expanded in the auxiliary turbine.

Obviously, many modifications and variations of the present invention are possible in light of the above teachings. It is, therefore, to be understood that within the scope of the appended claims the invention may be practiced otherwise than as specifically described.

That which is claimed is:

1. A method of supplying heat and power of the type which includes feeding compressed oxidant gas from a gas compressor to a combustion chamber in which combustion of a fuel takes place, flowing high pressure and temperature combustion products from the combustion chamber to an inlet end of a main turbine system so as to supply mechanical power to a shaft to thereby drive the shaft and so as to produce low pressure and temperature exhaust from an outlet end of the main turbine system, wherein the improvement comprises:
    (a) extracting at least a portion of an intermediate pressure and temperature exhaust from a point in between the inlet and outlet ends of the main turbine system;
    (b) passing the intermediate pressure and temperature exhaust through a regenerator in heat exchange relationship with the compressed oxidant gas so as to preheat the compressed oxidant gas before the oxidant gas enters the combustion chamber, thereby cooling the intermediate pressure and temperature exhaust to yield a regenerator exhaust;
    (c) passing the regenerator exhaust from the regenerator to an auxiliary turbine which also drives the shaft; and
    (d) flowing low pressure and temperature exhaust from the outlet end of the main turbine system to a heat exchanger so that heat is transferred from the low pressure and temperature exhaust to a fluid flowing through the heat exchanger in heat exchange relationship with the low pressure and temperature exhaust.

2. An improved method according to claim 1, further comprising regulating the flow of extracted intermediate pressure and temperature exhaust from the main turbine system so as to control the flow of low pressure and temperature exhaust from the outlet end of the main turbine system to the heat exchanger.

3. An improved method according to claim 2, wherein the intermediate pressure and temperature exhaust has a pressure of about 25 psia to about 100 psia.

4. An improved method according to claim 2, wherein the intermediate pressure and temperature exhaust has a temperature of about 1000° F. to about 1500° F.

5. An improved method according to claim 2, wherein the heat exchanger is a waste heat boiler and said fluid is water, and wherein in step (d) heat transfer to said fluid produces steam.

6. An improved method according to claim 5, further comprising passing the regenerator exhaust through a second boiler located between the regenerator and the auxiliary turbine.

7. An improved method according to claim 6, wherein the intermediate pressure and temperature exhaust has a pressure of about 25 psia to about 100 psia and a temperature of about 1000° F. to about 1500° F.

8. An improved method according to claim 2, wherein the main turbine system includes only one turbine.

9. An improved method according to claim 2, wherein the main turbine system comprises a first turbine and a second turbine having respective inlet and outlet ends such that the inlet end of the first turbine is the inlet end of the main turbine system and the outlet end of the second turbine is the outlet end of the main turbine system, at least a portion of exhaust from the outlet end of the first turbine being passed to the inlet end of the second turbine, and wherein in step (a) the remainder of the exhaust from the outlet end of the first turbine is extracted as intermediate pressure and temperature exhaust.

10. An improved method according to claim 2 wherein the shaft drives a load.

11. An apparatus for supplying heat and power of the type which includes a gas compressor, a combustion chamber which receives compressed oxidant gas from the compressor such that combustion of a fuel takes place in the combustion chamber, and a main turbine system for receiving high pressure and temperature combustion products at an inlet end from the combustion chamber so as to supply mechanical power to a shaft to thereby drive the shaft and so as to produce low pressure and temperature exhaust from an outlet end, wherein the improvement comprises:
    exhaust extraction means for extracting intermediate pressure and temperature exhaust from a point in between the inlet and outlet ends of the main turbine system;
    a regenerator for receiving intermediate pressure and temperature exhaust from the main turbine system and compressed oxidant gas from the compressor such that the intermediate pressure and temperature exhaust flows in the regenerator in heat exchange relationship with the compressed oxidant gas so as to preheat the compressed oxidant gas before the oxidant gas enters the combustion chamber, thereby cooling the intermediate pressure and temperature exhaust to yield a regenerator exhaust;
    an auxiliary turbine which is also adapted to drive the shaft;
    means for feeding the regenerator exhaust from the regenerator to the auxiliary turbine;
    a heat exchanger for receiving low pressure and temperature exhaust from the outlet end of the main turbine system such that the low pressure and temperature exhaust flows in the heat exchanger in heat exchange relationship with a fluid so as to heat the fluid.

12. An improved apparatus according to claim 11, further comprising a valve means which is adapted to regulate the flow of extracted intermediate pressure and temperature exhaust from the main turbine system.

13. An improved apparatus as recited in claim 12, wherein the main turbine system includes only one turbine.

14. An improved apparatus as recited in claim 13, wherein the heat exchanger is a waste heat boiler and the fluid is water.

15. An improved apparatus as recited in claim 14, further comprising:
 a second boiler located between the regenerator and the auxiliary turbine; and
 a means for passing the regenerator exhaust through the second boiler.

16. An improved apparatus according to claim 12, wherein the main turbine system comprises a first turbine and a second turbine having respective inlet and outlet ends such that the inlet end of the first turbine is the inlet end of the main turbine system and the outlet end of the second turbine is the outlet end of the main turbine system, at least a portion of exhaust from the outlet end of the first turbine being passed to the inlet end of the second turbine, and wherein said exhaust extraction means extracts the remainder of the exhaust from the outlet end of the first turbine as intermediate pressure and temperature exhaust.

17. An improved apparatus as recited in claim 16, wherein the heat exchanger is a waste heat boiler and the fluid is water.

18. An improved apparatus as recited in claim 17 further comprising:
 a second boiler located between the regenerator and the auxiliary turbine; and
 a means for passing the regenerator exhaust through the second boiler.

19. An improved apparatus as recited in claim 12 further comprising a load which is driven by the shaft.

* * * * *